United States Patent [19]

Pollerspöck

[11] Patent Number: 4,543,455
[45] Date of Patent: Sep. 24, 1985

[54] EXPLOSION-PROOF SWITCHING INSTALLATION WITH A BUS BAR DUCT

[75] Inventor: Kurt Pollerspöck, Berlin, Fed. Rep. of Germany

[73] Assignee: Siemens Aktiengesellschaft, Berlin and Munich, Fed. Rep. of Germany

[21] Appl. No.: 500,448

[22] Filed: Jun. 2, 1983

[30] Foreign Application Priority Data

Jun. 8, 1982 [DE] Fed. Rep. of Germany ....... 3221900

[51] Int. Cl.⁴ ........................................... H01H 27/00
[52] U.S. Cl. .................................. 200/50 B; 361/335; 361/378
[58] Field of Search ............... 361/335, 339, 346, 347, 361/348, 350, 342, 353, 355, 361, 376, 378, 393, 394, 417, 419, 374; 174/68 B, 71 B, 71 D, 72 R, 88 B; 200/51 R, 51.01, 51.09, 50 A, 50 B, 50 AA, 61.61, 61.71, 61.72

[56] References Cited

U.S. PATENT DOCUMENTS

| | | | |
|---|---|---|---|
| 1,793,846 | 2/1931 | Durbin | 200/51.01 |
| 3,437,768 | 4/1969 | Miller et al. | 200/50 AA |
| 3,763,891 | 7/1973 | Buxton | 361/353 |
| 4,001,653 | 1/1977 | Olashaw et al. | 361/353 |
| 4,041,358 | 8/1977 | Donahue et al. | 361/374 |
| 4,068,287 | 1/1978 | Kruzic et al. | 361/378 |
| 4,337,972 | 7/1982 | Gill | 361/339 |
| 4,414,440 | 11/1983 | De Coste | 200/50 B |

Primary Examiner—A. D. Pellinen
Assistant Examiner—Gregory D. Thompson
Attorney, Agent, or Firm—Kenyon & Kenyon

[57] ABSTRACT

A switching installation of explosion-proof design comprises a bus bar duct of the German protection class "Increased Safety" (Sch)e and housings of the German protection class "Explosion-Proof Enclosure" for accommodating switching devices. The electrical connection of the (Sch)d housings to the bus bar duct is accomplished by means of connectors, the jack part of which is fastened at the bus bar duct, and the plug part at the (Sch)d housings. Fastening means insure that the (Sch)d housings are connected to the bus bar duct sufficiently by the time the contact elements of the connectors come in contact with each other. In this condition, the plug connections already correspond to the protection class (Sch)d. In addition, an end switch is provided which makes it possible to attach the (Sch)d housings to the bus bar duct without load or without voltage. A protective lid can be flipped over the jack part of the connector if the (Sch)d housing is removed, in order to operate the end switch.

2 Claims, 2 Drawing Figures

EXPLOSION-PROOF SWITCHING INSTALLATION WITH A BUS BAR DUCT

BACKGROUND OF THE INVENTION

This invention relates to electric switching installations in general and more particularly to an improved explosion-proof switching installation.

A switching installation of explosion-proof design with a bus bar duct on the input side and control devices mounted in housings, of the German protection class "Explosion Proof Enclosure" known as (Sch)d, where explosion-proof contact elements are arranged between the (Sch)d housings and the bus bar duct, is described, for instance, in French Pat. No. 1,167,635. The switching devices contained in the explosion-proof housings are connected to the bus bar conductors located in the bus bar duct by disconnect switches which are designed as explosion-proof feedthroughs. In the disconnected position, a grounding contact is in effect at the same time. While this switching installation is intended for medium voltage (for instance, 3 or 4 kV), a bus bar duct located above has likewise been provided in a similar manner for several explosion-proof housings with low-voltage switching devices mounted side by side (British Pat. No. 1,171,355).

It is an object of the present invention to make a switching installation of the above-mentioned type more flexible by permitting explosion-proof housings equipped with switching devices to be added or removed without extensive installation work, if required.

SUMMARY OF THE INVENTION

In an electric switching installation of the type mentioned at the outset, this problem is solved by designing the contact elements as a plug connection of the protection class (Sch)d, the jack part of which is arranged at the bus bar duct and the plug part at the (Sch)d housings, and inserting fastening means for connecting the (Sch)d housing to the bus bar duct, the fastening means making a mechanical connection before the contact elements of the plug connections are inserted. In this manner, components of the switching installation can be added or temporarily removed for repair purposes without the need for an extended interruption of the operation. Individual explosion-proof housings are added or removed while the explosion protection is being fully maintained, because when the contact elements of the plug connection are separated or make contact with each other, the mechanical connection is either already made or still exists. If therefore an explosion takes place within the connector the mechanical connection between a (Sch)d housing and a bus bar duct is not separated. Furthermore, the protective gap of the plug connection is preserved, whereby an ignition breakdown is prevented.

Since it is not possible in general to design plug connections in such a manner that they can be opened or closed in the presence of large fault currents, precautions must be taken that such large currents do not flow when the plug connector is closed or opened. This can be accomplished by manually opening a protective switch preceding the bus bars, or by switching off the switching device contained in the (Sch)d housing. It is advisable for safety reasons to let this disconnect operation be made automatically. This can be done advantageously by additional contact elements for control lines which are actuated in the same sense as the power plug connection and which are connected into the control circuit of a protective switch superimposed on the bus bar duct, or into the control circuit of the switching device located in the (Sch)d housing.

It is advantageous to combine the contact elements which are provided for carrying the load current and the additional contact elements for control lines in one connector. This is likewise advantageous for the space utilization and operability of the installation. Next to the jack part of the connector, a threaded insert as well as an end switch may be arranged at the bus bar duct while a fastening screw cooperating with the threaded insert and acting on the end switch is provided at the (Sch)d housing. Through the physically close relationship of the fastening screw to the parts of the connector, the insertion forces of the connector are supplied practically solely by this screw. Its position therefore determines the present state of operation of the connector. The end switch associated with the threaded insert therefore reliably indicates whether the plug connection is in the open or closed state and can therefore be included in a control circuit which removes the voltage from the respective connector or from the entire switching installation, or at least disconnects the load current.

Near the jack part of the connector a protective lid may be movably fastened at the bus bar duct, next to the jack part in its rest position and over the jack part in its operating position. The lid also has a passage opening for a screw which cooperates with the threaded insert and the end switch. This arrangement permits the partial operation of the switching installation if it is only partially equipped with (Sch)d housings. For, if such a housing is removed, the facility is initially without voltage because the associated end switch is opened. By flipping the protective lid and screwing a screw into the threaded insert, the jack part of the connector is sealed against the environment, for one. By suitable design of the parts German protection class IP 54 can be obtained. In addition, the end switch is closed again and voltage is thereby applied to the installation. The switching installation is particularly useful in underground mining.

DETAILED DESCRIPTION

Figure 1:
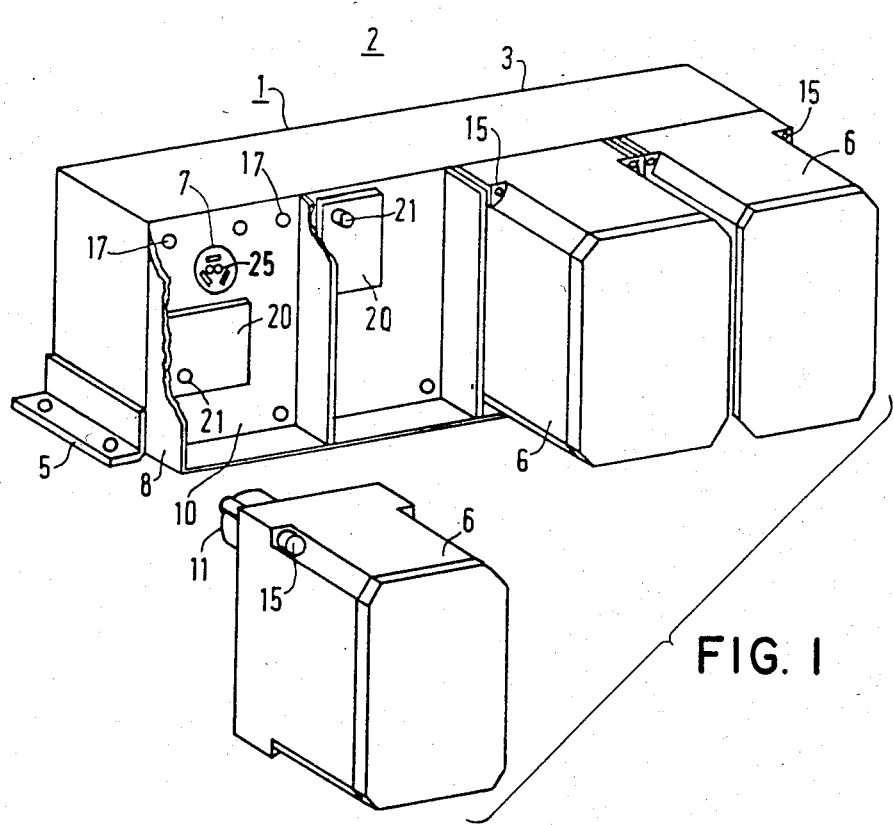
FIG. 1 is a perspective view a section of a bus bar duct with two explosion-proof housings fastened thereto, and a housing separated therefrom.
Figure 2:
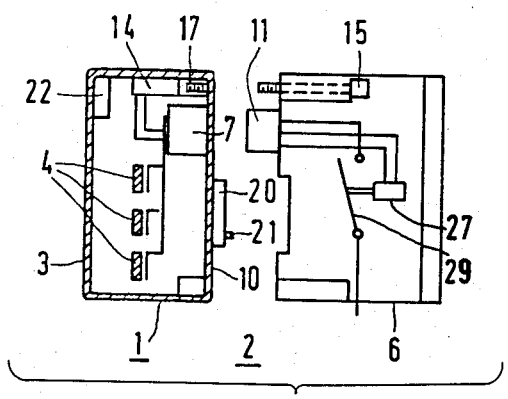
FIG. 2 is a cross-section of the bus bar duct, and a explosion-proof housing in a side view.

The bus bar duct 1 shown in FIG. 1 with the explosion-proof switching installation, designated generally as 2, has a housing 3 of rectangular cross-section, in which three bus bar conductors 4 are supported insulated in vertical spaced arrangement (FIG. 2). The bus bar duct can be terminated by a separate terminal housing for the incoming cables or a closing cover may be provided if the current is fed into the bus bar conductors 4 in some other way. The bus bar duct 1 is designed to meet the specifications of the German protection class "Increased Safety" known as (Sch)e, in which sparks capable of starting an ignition must not occur in operation. The housing 3 can therefore be made lighter than in a explosion-proof encapsulation. For mounting to a horizontal surface mounting angles brackets 5 are provided. Instead, the bus bar duct 1 may be fastened to a frame or rack. A frame 8 having outwardly extending walls is used for introducing the (Sch)d housings 6.

The switchgear belonging to the switching installation 2 is accommodated in several housings of the protection class "Explosion-Proof Enclosure" (Sch)d. Two of the housings 6 are shown in a position which they occupy in operation and in which they are connected to the bus bar duct 1. A further explosion-proof housing 6 is shown in its removed position to show the mating parts of a plug connection. The plug connection includes a jack part 7 which is arranged on the front side 10 of the housing 3, and a plug part 11 which is provided on the side of the explosion-proof housing 6 facing the front surface 10. In the example shown, the connectors have 3 poles, i.e., the contact elements assigned to the phases of the three-phase system and a protective conductor contact are combined in the jack part 7 and the plug part 11, respectively. In addition, the jack and plug part contain further contact elements 25 for control lines. Alternatively, the connectors may be designed as single contact connections. The connectors may be assigned the task of closing, when a explosion-proof housing 6 is placed on the bus bar duct 1, the control circuit of the switching devices or a preceeding protective switch only if the power connector consisting of the jack part 7 and the plug part 11 is properly closed. In the present embodiment, however, a separate end switch 14 is provided which is mechanically operated when a explosion-proof housing 6 is connected to the bus bar duct 1 (FIG. 2). End switch 14 is coupled to the control contacts 25 and used to control a contactor 27 for a switch 29 in housing 6.

Each of the explosion-proof housings 6 is provided with four screws 15 which are arranged near the corners of the housing. The screws 15 cooperate with corresponding threaded inserts 17 which are arranged on the first side 10 of the bus bar duct 1. The length and the support of at least one of the screws 15 are designed so that in all cases a mechanically supporting connection is established before the contact elements of the power connector come into engagement with each other. Advantageously, the screw 15 next to the plug part 11 is designed in this manner. Through the proximity it is achieved that the insertion forces are supplied practically by this screw 15 alone, while the remaining screws serve purely for fastening purposes. This screw 15, in the upper left corner also operates end switches 14.

The connector is designed so that it in turn forms a space complying with the regulations regarding the protection class "Explosion-Proof Enclosure" before the contact elements touch each other. Therefore, should an explosive mixture be ignited when a explosion-proof housing 6 is placed on the bus bar duct 1, a breakdown is prevented because the plug connection has already formed a explosion-proof enclosure with a protective gap, and a separation of this plug connection or an opening of the explosion-proof space of the connector is made impossible by the mechanical connection which is already established by the screws 15.

Instead of the frame 8, other devices for supporting the explosion-proof housing 6 may also be provided, for instance, in the form of insertion tracks which extend forward from the front side 10 of the bus bar duct.

Essential for the new switching installation are protective lids 20 which are associated with the jack part 7 of the connectors in the same manner. The protective lids 20 are always fastened movably to the front side 10 of the housing 3 of the bus duct 1 and occupy, under their own weight, the position such as is shown in FIG. 1 in the area of the first panel of the bus bar duct 1 from the left. If the switching installation 2 is to be put in operation even if one or more of the (Sch)d housings are missing, the available jack parts 7 are closed off by turning the protective lids 20 up and securing them in this position with a screw 21. The screw 21 extends through a corresponding opening of the protective lid 20 and engages the left upper threaded insert 17 in the same manner as a corresponding screw 15 of one of the (Sch)d housings. Thereby, the end switch 14 is also operated and the installations is made ready for operation. A protective lid in this operating position is shown in the second panel from the left in FIG. 1.

In addition to the already described details, FIG. 2 further shows a wire duct 22 through which the control lines are run.

In the embodiment according to FIG. 1, the bus bar duct 1 is designed for four housings 6 of equal size. A switching facility of this kind can be expanded by adding another bus bar duct to the bus bar duct shown and connecting it thereto, so that then a correspondingly larger number of explosion-proof housings can be used. On the other hand, bus bar ducts for a larger or smaller number of explosion-proof housings can be used as well as housings of different design and corresponding bus bar ducts.

What is claimed is:

1. In an electric switching installation of explosion-proof design with a bus bar duct on the input side and switching and control devices accommodated in housings designed to meet the requirements of the protection class "explosion-proof enclosure", wherein an explosion-proof plug connection, having a plug part and a jack part, and a safety element for the mutual locking of both parts, are arranged between each housing and the bus bar duct, wherein the safety element prevents removal of said housing from said bus bar duct when voltage is present in the bus bar duct, the improvement comprising:

(a) the jack parts arranged on the bus bar duct, and the plug parts on the housings; and (b) the safety element being formed by a threaded insert and an end switch mounted on said bus bar duct next to each jack part and a fastening screw on each enclosure, cooperating with the threaded insert to mechanically connect said housings to said bus bar duct and, after such connection is made, actuating said end switch such as to effect voltage supply to the bus bar duct when said housing is connected to said bus bar duct and to cut off voltage supply when said housing is removed from said bus bar duct.

2. In an electric switching installation of explosion-proof design with a bus bar duct on the input side and switching and control devices accommodated in housings designed to meet the requirements of the protective class "explosion-proof enclosure", wherein an explosion-proof plug connection, having a plug part and a jack part, and a safety element for the mutual locking of both parts, are arranged between each housing and the bus bar duct, wherein the safety element prevents removal of said housing from said bus bar duct when voltage is present in the bus bar duct, the improvement comprising:

(a) the jack parts arranged on the bus bar duct, and the plug parts on the housings;

(b) the safety element formed by a threaded insert and an end switch mounted on said bus bar duct next to each jack part and a fastening screw on each enclosure, cooperating with the threaded insert to mechanically connect said housings to said bus bar duct and after such connection is made, actuating said end switch such as to effect voltage supply to the bus bar duct when said housing is connected to said bus bar duct and to cut off voltage supply when said housing is removed from said bus bar duct; and (c) a protective lid movable fastened at the bus bar duct near the jack pat, said lid in its rest position exposing the jack part and in its operating position covering the jack part and said lid having a passage opening for a screw for cooperating with said threaded sleeve and said end switch.

* * * * *